United States Patent
Oh et al.

(10) Patent No.: US 12,173,555 B2
(45) Date of Patent: *Dec. 24, 2024

(54) STORAGE BOX HAVING DISPLAY PANEL

(71) Applicant: INTOSEE CO. LTD, Cheonan-si (KR)

(72) Inventors: Jae Hwan Oh, Cheonan-si (KR); Chan Ho Kim, Cheonan-si (KR); Eun Seon Chi, Cheonan-si (KR); Ye Lin Han, Cheonan-si (KR)

(73) Assignee: INTOSEE CO., LTD, Cheonan-si (KR)

( * ) Notice: Subject to any disclaimer, the term of this patent is extended or adjusted under 35 U.S.C. 154(b) by 725 days.

This patent is subject to a terminal disclaimer.

(21) Appl. No.: 17/417,633

(22) PCT Filed: Jan. 11, 2021

(86) PCT No.: PCT/KR2021/000290
§ 371 (c)(1),
(2) Date: Jun. 23, 2021

(87) PCT Pub. No.: WO2021/145615
PCT Pub. Date: Jul. 22, 2021

(65) Prior Publication Data
US 2022/0003039 A1  Jan. 6, 2022

(30) Foreign Application Priority Data

Jan. 16, 2020 (KR) .................. 10-2020-0005894
Aug. 10, 2020 (KR) .................. 10-2020-0099707
Oct. 21, 2020 (KR) .................. 10-2020-0136535

(51) Int. Cl.
*E06B 9/24*   (2006.01)
*E06B 3/67*   (2006.01)
*H05B 47/115* (2020.01)

(52) U.S. Cl.
CPC .............. *E06B 9/24* (2013.01); *E06B 3/6722* (2013.01); *H05B 47/115* (2020.01); *E06B 2009/2417* (2013.01); *E06B 2009/247* (2013.01)

(58) Field of Classification Search
CPC .. E06B 9/24; E06B 3/6722; E06B 2009/2417; E06B 2009/247; H05B 47/115
(Continued)

(56) References Cited

U.S. PATENT DOCUMENTS 9,989,692 B2 *  6/2018  Etienne .................. C03C 15/00
10,921,638 B2 *  2/2021  Watanabe ................ G09F 9/00
(Continued)

FOREIGN PATENT DOCUMENTS

CN         106014154 A     10/2016
KR   10-2007-0103180 A     10/2007
(Continued)

*Primary Examiner* — Janet M Wilkens
*Assistant Examiner* — Timothy M Ayres
(74) *Attorney, Agent, or Firm* — NKL Law; Jae Youn Kim (57) ABSTRACT

A storage box having a display panel, which allows an article inside a body to be confirmed from the outside according to an increase in the amount of light caused by an internal light source is disclosed. The storage box having a display panel includes the body and a door including a frame and mounted on the body to be opened and closed, wherein the door includes a glass member provided on a front surface side of the frame, a protective panel provided on an inner surface side of the frame, and a transmittance-variable panel provided between the glass member and the protective panel, the transmittance-variable panel is a panel made of a thermoplastic resin of PMMA or PC and nano-sized dyes, a plurality of nano-sized pores are provided in the transmittance-variable panel.

12 Claims, 10 Drawing Sheets

(58) Field of Classification Search
USPC .......................................................... 312/114
See application file for complete search history.

(56) References Cited

U.S. PATENT DOCUMENTS

| | | | |
|---|---|---|---|
| 11,003,032 B2* | 5/2021 | Oh | G02F 1/13306 |
| 11,576,490 B2* | 2/2023 | Oh | G02B 27/144 |
| 11,730,050 B2* | 8/2023 | Shin | H10K 77/111 |
| 11,800,736 B2* | 10/2023 | Yoon | H10K 59/87 |
| 2009/0059368 A1* | 3/2009 | Kamada | B32B 17/10458 |
| | | | 977/773 |
| 2013/0120700 A1* | 5/2013 | Kitson | G02F 1/133555 |
| | | | 349/114 |
| 2013/0164521 A1* | 6/2013 | Myoung | H01G 9/20 |
| | | | 428/312.6 |
| 2014/0102526 A1* | 4/2014 | Matsuo | H01G 9/2013 |
| | | | 136/255 |
| 2018/0257347 A1 | 9/2018 | Washio et al. | |
| 2021/0339913 A1* | 11/2021 | Oh | B65D 25/54 |
| 2022/0178199 A1* | 6/2022 | Oh | E06B 9/24 |

FOREIGN PATENT DOCUMENTS

| | | |
|---|---|---|
| KR | 10-2012-0014879 A | 2/2012 |
| KR | 10-1841672 B1 | 3/2018 |

* cited by examiner

STORAGE BOX HAVING DISPLAY PANEL

TECHNICAL FIELD

The present invention relates to a storage box having a display panel, and more particularly, to a storage box having a display panel through which an article inside a body can be confirmed from the outside due to an increase in a light amount by an internal light source.

BACKGROUND ART

In general, a hinge is a device attached to a body and a door to allow the door to be opened and closed. A hinge is a device that is made to rotate about two symmetrical metal-plate column axes that are engaged with each other, and is kind of metal decoration with the same function as a hook-and-eye hinge. Hinges are classified into exposed hinges and hidden hinges according to the attached appearance and classified into long hinges and short hinges according to a size thereof. The purpose of a hinge is to open and close a door by connecting the door to a body, and thus the hinge is an essential device in a hinged door.

Meanwhile, schools, laboratories, hospitals, and the like have doors that do not transmit light in order to block light from chemicals, volatile substances, explosive substances, chemical substances, and the like that react to light such as sunlight and indoor lighting. Accordingly, there is no way to confirm an internal state other than opening the door to confirm the inside, or there is no way to see the internal state without using a special device.

In particular, even when chemicals leak, toxic gases are formed, or a fire occurs inside a storage box, danger is increased because it cannot be immediately known, and when a user opens the door in this case, the user has to open the door without confirming the internal state, which is very dangerous to the user.

An example of a technique for solving such a problem is disclosed in Patent Documents 1 to 3 below.

Figure 1:
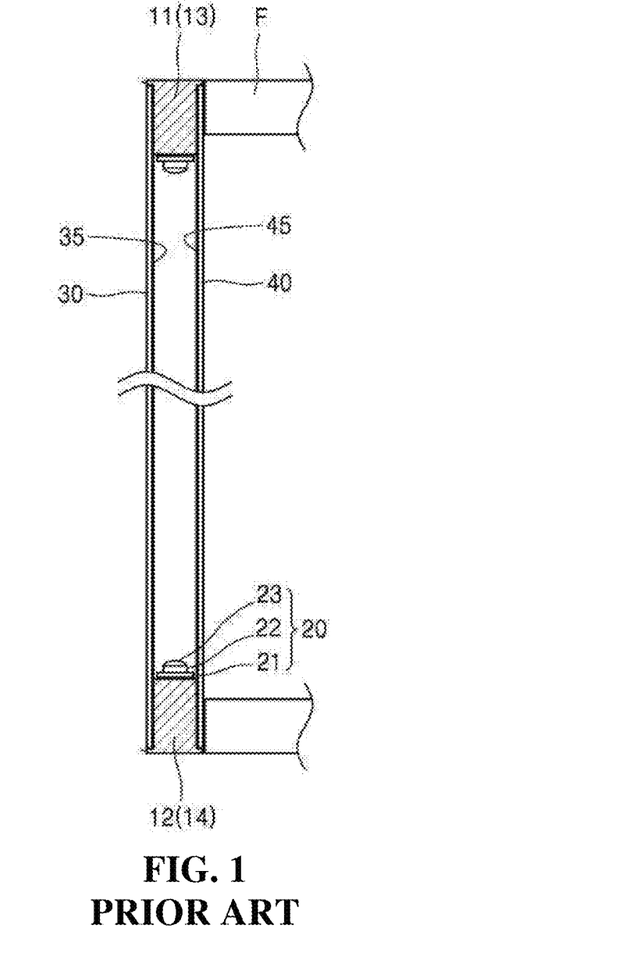
FIG. 1 is a view for describing a state in which a light-emitting diode (LED) module is mounted on a conventional door frame.

For example, as shown in FIG. 1, Patent Document 1 (Korean Registered Patent Publication No. 10-1632300, registered on Jun. 15, 2016) discloses, as a functional see-through door for furniture installed at an entrance of furniture F, a functional see-through door for furniture including square frame-shaped door frames 11 to 14, a substrate 21 installed on an inner side of the door frame, a light-emitting diode (LED) module 20 having an LED chip 22 and a lens 23, a front transparent member 30 fixed to a front side of the door frame, a first reflective layer 35 that is positioned on the front transparent member 30 and configured to reflect light, a rear transparent member 40 fixed to a rear side of the door frame, a cover body positioned on the rear transparent member 40 and having a second reflective layer 45 that reflects light and a "C" shape whose cross section opens upward, and a module cover formed on an inner side surface of an entrance side of the cover body and having a fitting groove 62 into which the PCB substrate 21 of the LED module is inserted.

In addition, Patent Document 2 (Korean Registered Patent Publication No. 10-1975757, registered on Apr. 30, 2019) discloses a state-detection see-through storage box including a storage box body in which an article is stored, a sensor configured to detect a specific state inside the storage box, a door installed on the storage box body and having a transparent window, a light-emitting module that increases the amount of light reflected from the inside of the storage box and directed toward the transparent window by increasing a light-emission amount according to a signal from the sensor configured to detect a specific state inside the storage box, and an optical film provided in the transparent window, and allowing a specific state inside the storage box body to be identified.

Meanwhile, Patent Document 3 (Korean Registered Patent Publication No. 10-1376705, registered on Mar. 14, 2014) discloses a hinge for furniture including a lighting device that is coupled to an outer surface of a furniture coupling part of a hinge part and is controlled to be in contact with a door fixing part when the door is open, wherein the lighting device includes a lighting body that is seated and coupled to the furniture coupling part so as not to be separated upward and downward, an LED lamp part that is formed at a rear side of the lighting body to be inclined, and provided to irradiate light into the inside of the furniture, a lighting switch part provided to protrude forward from the lighting body and configured to turn off the LED lamp part by coming into contact with the door fixing part and to turn on the LED lamp part when the door fixing part is separated, and a power supply provided inside the door fixing part.

DISCLOSURE

Technical Problem

In the above-described technique disclosed in Patent Document 1, a first reflective layer having a reflectance of 50 to 70% and a second reflective layer having a reflectance of 10 to 20% are provided, and the first reflective layer and the second reflective layer are attached to a front transparent member and a rear transparent member, respectively, and thus there is a problem that a manufacturing process is complicated.

In addition, in the technique disclosed in Patent Document 2, sensors such as a temperature sensor for detecting the temperature inside a storage box body, an optical sensor for detecting illuminance, a substance detection sensor for detecting chemical substances, a movement detection sensor, and the like are provided, and thus there is a problem that it is not possible to detect changes in the inside of a container stored in the storage box, and because an optical film is attached to an outer surface of an external transparent window, there is a problem that the amount of external light cannot be reduced when the optical film is damaged during use.

Meanwhile, Patent Document 3 discloses a configuration in which, when a door is open, a door fixing part is separated from a lighting switch part, and an LED lamp part is lit to illuminate the inside of furniture, but there is a problem that a state of the inside of the furniture cannot be visually confirmed when the door is closed.

The object of the present invention is to solve the above-described problems, and it is an object of the present invention to provide a storage box having a display panel through which an article inside a body can be confirmed from the outside by reducing the amount of light incident from the outside of the storage box for storing dangerous substances such as chemicals, volatile substances, explosive substances, and chemical substances which react to external light in a school, a laboratory, a hospital, an aging room, and the like and increasing a light amount by light irradiated from the inside of a door.

It is another object of the present invention to provide a storage box having a display panel capable of preventing the risk of electric leakage, electric shock, or the like due to humidity or moisture.

It is another object of the present invention to provide a storage box having a display panel capable of reducing power consumption by detecting the movement at a door, for example, a touch, tapping, movement, or the like of a user, to cause a light-emitting member to operate.

It is another object of the present invention to provide a storage box having a display panel capable of preventing damage of equipment and an electric shock by supplying and blocking power according to an opening and closing operation of a door in a contact manner.

Technical Solution

In order to achieve the above objects, a storage box having a display panel according to the present invention includes a body, and a door including a frame and mounted on the body to be opened and closed, wherein the door includes a glass member provided on a front surface side of the frame, a protective panel provided on an inner surface side of the frame, and a transmittance-variable panel provided between the glass member and the protective panel, the transmittance-variable panel is a panel made of a thermoplastic resin of polymethyl methacrylate (PMMA) or polycarbonate (PC) and nano-sized dyes, a plurality of nano-sized pores are provided in the transmittance-variable panel, and the transmittance-variable panel reduces light transmittance.

Further, in the storage box having a display panel according to the present invention, a size of each of the nano-sized pores may be in a range of 20 to 50 nm, the transmittance-variable panel may be formed to a thickness of 3 to 5 mm, and an arithmetic average roughness (Ra) of a surface of the transmittance-variable panel may be in a range of 1.2 to 1.9 nm.

Further, in the storage box having a display panel according to the present invention, a light-emitting member configured to irradiate light to the protective panel and the transmittance-variable panel may be provided in the body.

Further, in the storage box having a display panel according to the present invention, a light-emitting member may be provided between the protective panel and the transmittance-variable panel.

Further, the storage box having a display panel according to the present invention may further include a power supply member configured to supply power to the light-emitting member, wherein the power supply member may include a first power supply member coupled to a hinge and a second power supply member coupled to the frame.

Further, in the storage box having a display panel according to the present invention, an electrical connection between the first power supply member and the second power supply member may be formed when the door is closed, and the electrical connection between the first power supply member and the second power supply member may be cut off when the door is open.

Further, in the storage box having a display panel according to the present invention, the first power supply member may include a first protrusion protruding from a first terminal, the second power supply member may include a second protrusion protruding from a second terminal, and power may be supplied to the light-emitting member by the first protrusion being brought into contact with the second terminal and the second protrusion being brought into contact with the first terminal.

Further, in the storage box having a display panel according to the present invention, a coupling groove may be provided on a side surface of the hinge, a pair of coupling parts may be provided in the first power supply member, and the first power supply member may be fastened to the hinge by fitting the pair of coupling parts into the coupling groove.

Further, in the storage box having a display panel according to the present invention, a movement detection member may be provided in the door, and the light-emitting member may emit light when a movement of the door is detected by the movement detection member.

Further, in the storage box having a display panel according to the present invention, a movement detection member may be provided in the body or door, and the light-emitting member may emit light when a movement of a user is detected by the movement detection member.

Advantageous Effects

As described above, in a storage box having a display panel according to the present invention, a transmittance-variable panel is provided between a glass member and a protective panel, and a light-emitting member is provided between the protective panel and the transmittance-variable panel or in a body, so that it is possible to obtain an effect that an article inside the body can be confirmed from the outside by reducing the amount of light incident from the outside and increasing the amount of light by the light-emitting member provided on the inside of a door.

Further, in a storage box having a display panel according to the present invention, it is also possible to obtain an effect that the risk of electric leakage, electric shock, or the like due to humidity or moisture can be prevented by providing a light-emitting member in a body.

Further, in a storage box having a display panel according to the present invention, it is also possible to obtain an effect that power consumption can be reduced by electrically connecting a first power supply member and a second power supply member when a door is closed, and supplying power to a light-emitting member when information about door movement is detected.

Further, in a storage box having a display panel according to the present invention, it is also possible to obtain an effect that equipment damage and an electric shock can be prevented by providing a structure in which an electrical connection between a first power supply member and a second power supply member is formed when a door is closed, and the electrical connection between the first power supply member and the second power supply member is cut off when the door is open.

MODES OF THE INVENTION

The above objects and other objects and new features of the present invention will become more apparent from the description of the present specification and accompanying drawings.

As used herein, the term "storage box" refers to a box including a door and provided to store articles, and a box capable of storing and maintaining the articles, such as a dedicated storage box for storing dangerous substances such as chemicals, volatile substances, explosive substances, and chemical substances which react to external light in a school, a laboratory, a hospital, an aging room, or the like, a refrigerator, a freezer, a food aging container, a food refrigeration container, a cup storage box with a sterilization function, an unmanned article storage box, a charnel storage container, a document storage box, a kitchen cabinet for tableware or the like, a bathroom cabinet, a delivery cabinet, a switch box, and the like.

As used herein, the term "frame" refers to one made of a metal material or high-strength plastic having an approximately quadrangular shape to maintain the overall shape of a door, the term "front surface of the frame" refers to a part for opening the door to the outside, the term "inner surface of the frame" refers to a part facing a body in which an article is stored, the term "upper or lower frame" refers to a frame located on an upper or lower portion of a door frame, and the term "left or right frame" refers to a frame located on a left or right side of the door frame.

In addition, as used herein, the term "display panel" refers to a panel that is provided on a door, and includes a glass member, a transmittance-variable panel, and a protective panel to recognize an article or the like inside a body used as a storage box.

Meanwhile, as used herein, the term "transmittance-variable panel" refers to a panel made of a thermoplastic resin of polymethyl methacrylate (PMMA) or polycarbonate (PC) and nano-sized dyes, and has a function of reducing light transmittance from the outside.

First, a function of a transmittance-variable panel according to the present invention will be described with reference to FIGS. 2 and 3.

Figure 2A:
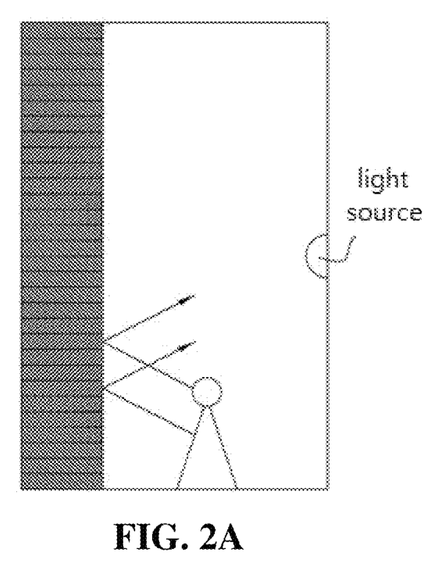
FIGS. 2A-2B are views for describing a function of a transmittance-variable panel according to the present invention.
Figure 2B:
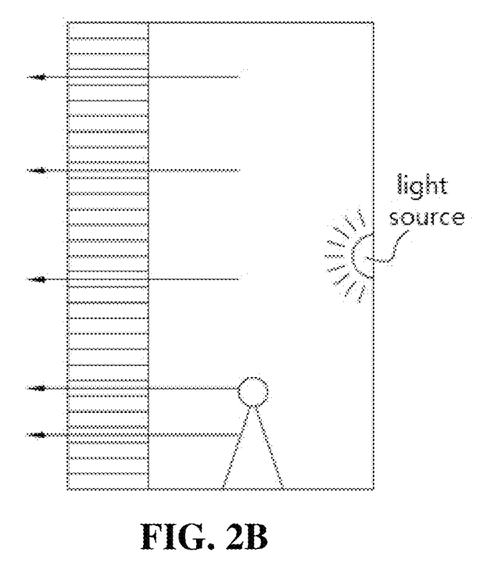
Figure 3A:
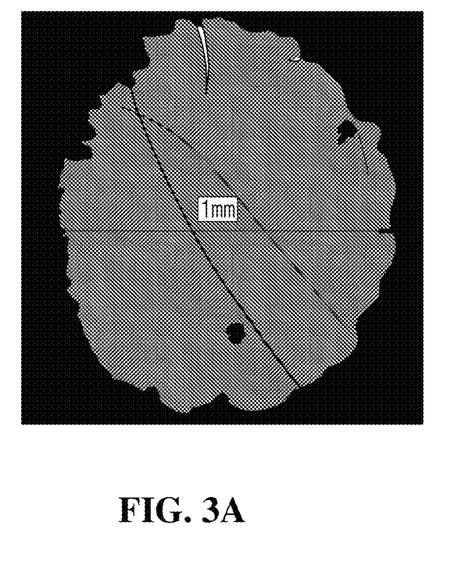
FIGS. 3A-3B are photographs illustrating a change state of light transmittance according to ON/OFF of a light-emitting member in the transmittance-variable panel.
Figure 3B:
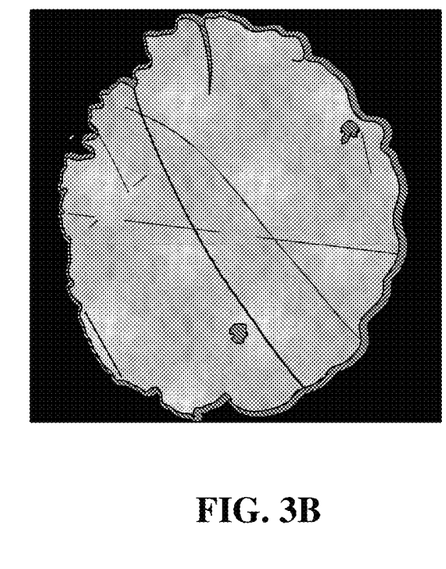

FIGS. 2A-2B are views for describing the function of the transmittance-variable panel according to the present invention, and FIGS. 3A-3B are photographs illustrating a change state of light transmittance according to ON/OFF of a light-emitting member in the transmittance-variable panel.

A plurality of nano-sized pores are provided in the transmittance-variable panel according to the present invention, and thus, when a light source is turned off, the transmittance of light incident from the outside is reduced as shown in FIG. 2A, and the transmittance-variable panel is maintained in a dark state as shown in FIG. 3A, and therefore an article inside the body cannot be confirmed from the outside. On the other hand, when the light source is turned on, the transmittance of the light is increased by the irradiation of light from the light source toward the transmittance-variable panel as shown in FIG. 2B, and the transmittance-variable panel is maintained in a bright state as shown in FIG. 3B, so that the article inside the body can be confirmed from the outside.

Hereinafter, an embodiment according to the present invention will be described in detail with reference to the drawings.

Figure 4:
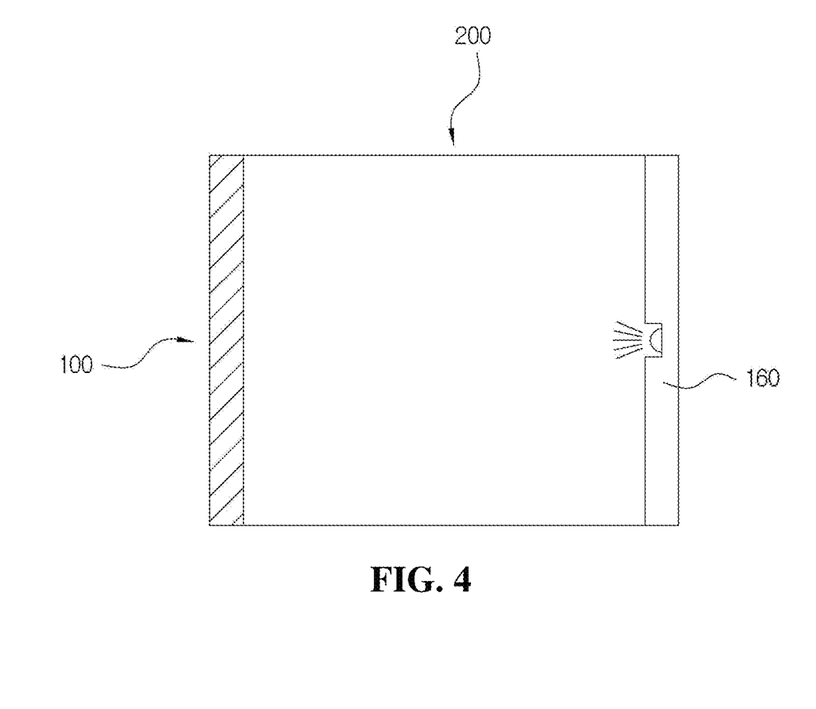
FIG. 4 is a cross-sectional view for describing an example of a storage box having a display panel according to the present invention.
Figure 5:
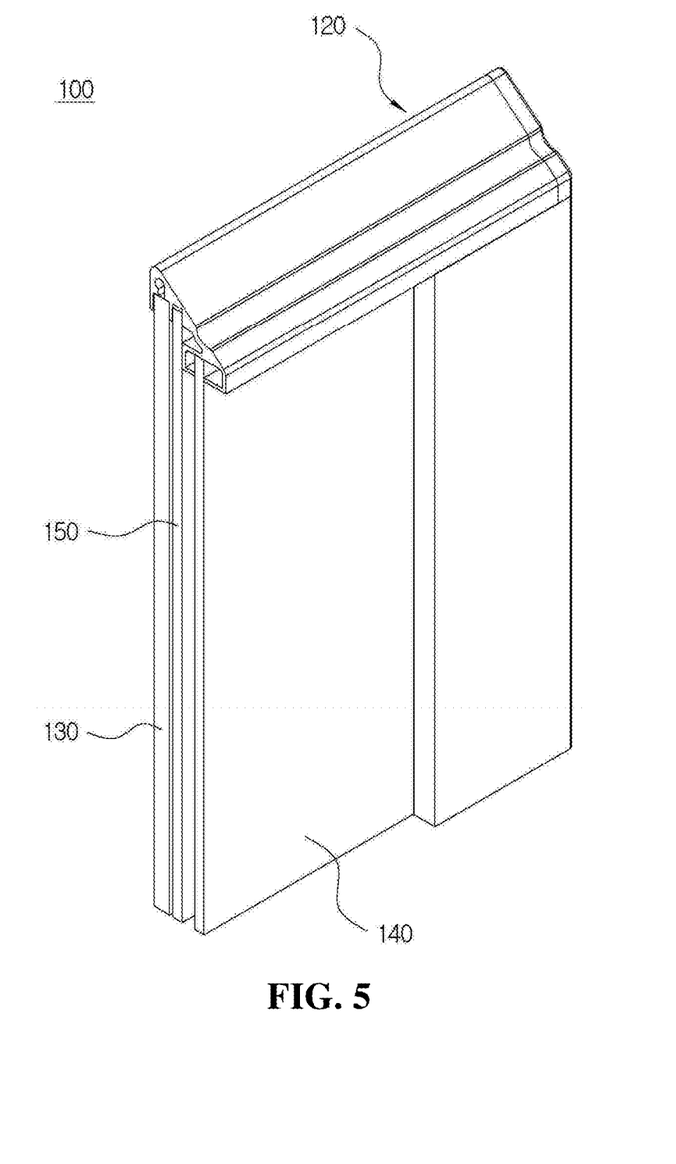
FIG. 5 is a perspective view illustrating an example of a door, a portion of which is cut away, having a transmittance-variable panel shown in FIG. 4.
Figure 6:
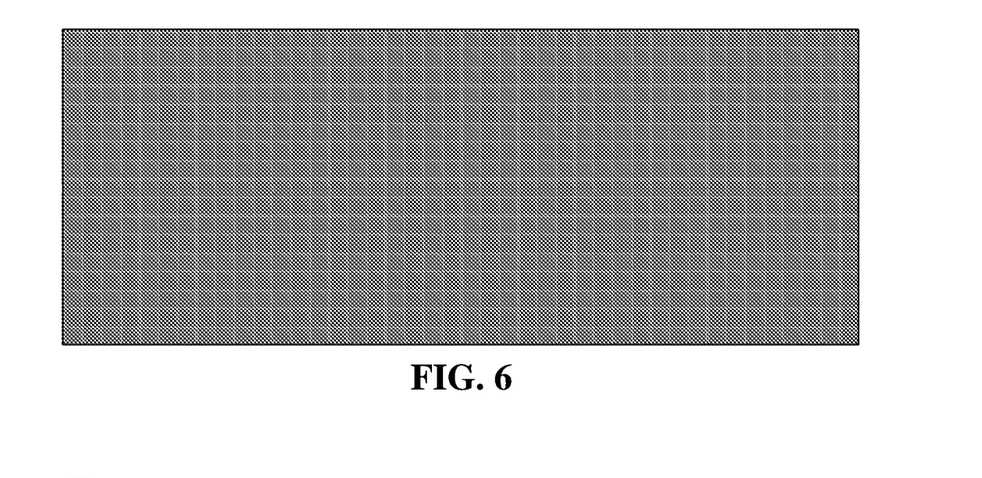
FIG. 6 is a photograph illustrating an example of the transmittance-variable panel shown in FIG. 5.
Figure 7:
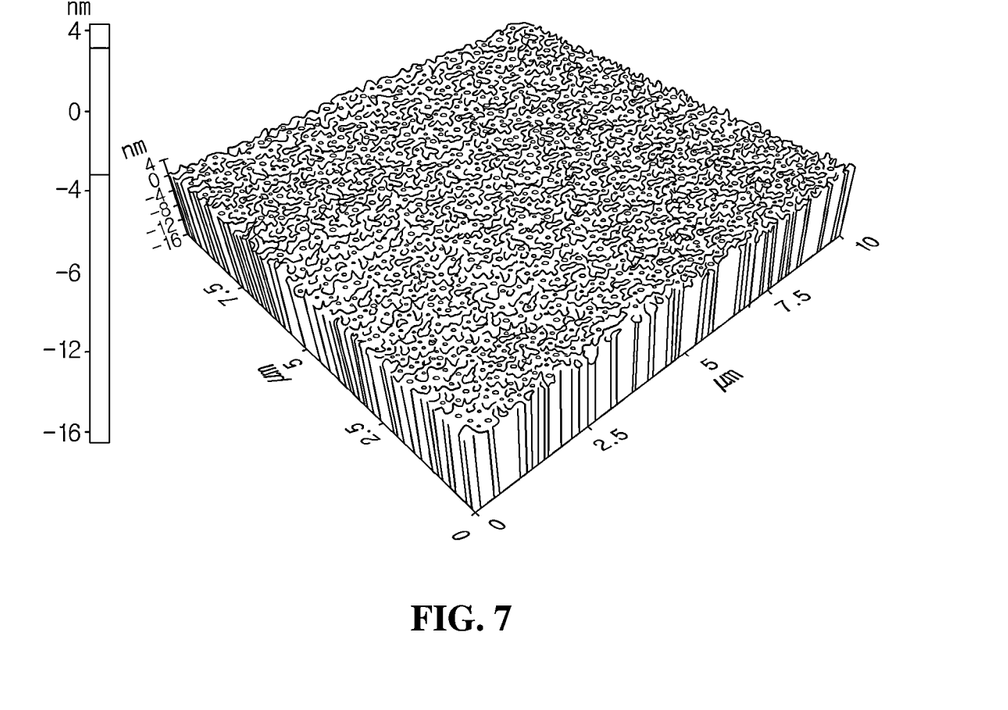
FIG. 7 is a view illustrating a surface state of the transmittance-variable panel shown in FIG. 6.

FIG. 4 is a cross-sectional view of a storage box having a display panel according to the present invention, FIG. 5 is a perspective view illustrating an example of a door, a portion of which is cut away, having a transmittance-variable panel shown in FIG. 4, FIG. 6 is a photograph illustrating an example of the transmittance-variable panel shown in FIG. 5, and FIG. 7 is a view illustrating a surface state of the transmittance-variable panel shown in FIG. 6.

As shown in FIG. 4, the storage box having a display panel according to the present invention includes a door 100 and a body 200, and the door 100 is provided on a front surface of the body in order to open and close the body 200 and includes a frame as an opening and closing member provided to be rotatable in a front direction of the body 200.

The door 100 according to the present invention is a door including a frame 120 and mounted on the body 200 with, for example, a hinge to be opened and closed, as shown in FIG. 5, and includes a glass member 130 provided on a front surface side of the frame 120, a protective panel 140 provided on an inner surface side of the frame 120, and a transmittance-variable panel 150 provided between the glass member 130 and the protective panel 140 and made of a thermoplastic resin of polymethyl methacrylate (PMMA) or polycarbonate (PC) and nano-sized dyes, and as shown in FIG. 4, the body 200 may include a light-emitting member 160 configured to irradiate light to the protective panel 140 and the transmittance-variable panel 150, and a power supply member configured to supply power to the light-emitting member 160.

In order to maintain the overall shape of the door 100, the frame 120 may be made of an approximately quadrangular-shaped metal material, high-strength plastic, or wood material, and a packing member such as silicone, rubber, or the like for sealing the body may be provided on a circumferential portion of the frame 120. In addition, in the above description, the frame 120 is described as having a quadrangular shape, but is not limited thereto, and may be provided in a shape such as a circular shape or an elliptical shape.

The glass member 130 is tempered glass provided on the front surface side of the frame 120 to protect the transmittance-variable panel 150, and the glass member 130 may include a movement detection member. That is, the movement detection member is provided on an inner side of the glass member 130, detects the movement of the glass member 130 caused by a user touching or tapping the glass member 130, and transmits a detected signal to the light-emitting member 160. The movement detection member may be wired or wirelessly connected to the light-emitting member 160 using a typical method. In addition, the movement detection member may be provided as a movement detection sensor that reacts according to the movement of the user, for example, the movement of a user's hand.

In addition, although the structure in which the movement detection member is provided on the glass member 130 has been described above, the present invention is not limited thereto, and the movement detection member may be provided on one side of the frame 120 or an upper portion of the body. Thus, it is provided in a structure in which the light-emitting member 160 emits light when the movement of the door 100 is detected by the movement detection member. In addition, it may also be provided in a structure in which the light-emitting member 160 emits light when the movement of the user is detected by the movement detection member.

The protective panel 140 is a glass member provided on the inner surface side of the frame 120 in order to protect the transmittance-variable panel 150. In addition, although a configuration in which the glass member 130 and the protective panel 140 are made of tempered glass has been described above, the present invention is not limited thereto, and a transparent member that transmits light, for example, acrylic or the like, may be applied to the glass member 130 and the protective panel 140. As shown in FIG. 5, the glass member 130 and the protective panel 140 may be fitted into the frame 120 having a plurality of insertion portions and molded with a silicone resin.

As shown in FIGS. 6 and 7, a plurality of nano-sized pores are provided in the transmittance-variable panel 150 to reduce the transmittance of light incident from the outside of the door 100, and when the amount of light is increased between the transmittance-variable panel 150 and the protective panel 140 due to light irradiated from the light-emitting member 160 provided in the body 200, light transmittance is increased, so that an article inside the body can be confirmed from the outside.

As shown in FIGS. 6 and 7, the transmittance-variable panel 150 is a panel made of a thermoplastic resin of polymethyl methacrylate (PMMA) or polycarbonate (PC) and nano-sized dyes, a plurality of nano-sized pores each having a size of 20 to 50 nm are formed in the panel, and an arithmetic average roughness (Ra) of a surface of the panel is 1.2 to 1.9 nm. In addition, the panel is manufactured to a thickness of 3 to 5 mm by further adding nano-sized dyes in a process of manufacturing materials such as acryl, PC, and the like, and the nano-sized pores are formed by adding the nano-sized dyes.

As shown in FIG. 5, the transmittance-variable panel 150 may also be fitted into the frame 120 having a plurality of insertion portions and may be molded with a silicone resin.

Accordingly, when the light-emitting member 160 is turned on, as shown in FIG. 2B, light irradiated from the light-emitting member toward the transmittance-variable panel passes through the plurality of nano-sized pores and thus the transmittance-variable panel 150 is maintained in a bright state with an increased amount of light as shown in FIG. 3B, so that the user can confirm the article inside the body 200 from the outside.

As shown in FIG. 4, the light-emitting member 160 may be provided at an approximately central portion in the body 200, and may include a substrate, a plurality of light-emitting diode (LED) light sources provided on the substrate, and a diffusion plate provided on the plurality of LED light sources. In FIG. 4, the structure in which the light-emitting member 160 is provided at an approximately central portion of a rear surface of the body 200 is illustrated, but the present invention is not limited thereto, and the light-emitting member 160 may also be provided on the upper portion of the body 200. That is, when the structure according to an embodiment of the present invention is applied to, for example, a bathroom cabinet or the like, the risk of electric leakage, electric shock, or the like due to humidity or moisture may be prevented.

As shown in FIG. 5, the door frame 120 according to the present invention includes a main frame having an upper or lower frame and a left or right frame that maintain the glass member 130 and the transmittance-variable panel 150, a module frame that is fitted into the main frame, made of a transparent material, and configured to maintain the protective panel 140, an assembly cover fitted into one side of the upper or lower frame, and a coupling bracket configured to couple the upper or lower frame and the left or right frame, and the coupling bracket may be provided in a structure that is inserted into the upper or lower frame and the left or right frame.

The upper or lower frame is an upper or lower side frame for forming the door, and as shown in FIG. 5, a first insertion part, which has an approximately triangular cross-section and is used for inserting the glass member 130, and a second insertion part for inserting the transmittance-variable panel are provided on an inner side of the upper or lower frame in a longitudinal direction.

As shown in FIG. 5, a width of the first insertion part is provided to be greater than a width of the second insertion part, and a dimension of such a width may be changed according to a thickness of each of the glass member 130 and the transmittance-variable panel 150, and is made so that each of the glass member 130 and the transmittance-variable panel 150 is maintained in a fitted state.

Meanwhile, as shown in FIG. 5, the upper or lower frame is formed in a triangular shape to be inclined downward from an upper side toward the storage box so that, when the door 100 is open, a user's hand is inserted between the body 200 and the door 100 to pull the door 100, and includes a semi-circular groove so that a user's finger may be inserted thereinto.

The left or right frame is a left or right side frame for forming the door, and in the left or right frame, a first insertion part for inserting the glass member 130 and a second insertion part for inserting the transmittance-variable panel 150 are provided in the same shape as the upper or lower frame so that each of the glass member 130 and the transmittance-variable panel 150 may be maintained in a fitted state. The left or right frame may include a second guide part to which the module frame is coupled, and a guide protrusion for coupling with the coupling bracket.

The module frame may include a third insertion part for inserting the protective panel 140 and a rail part formed on an outer side thereof.

Next, another example of the storage box having a display panel according to the present invention will be described with reference to FIGS. 8 to 10.

Figure 8:
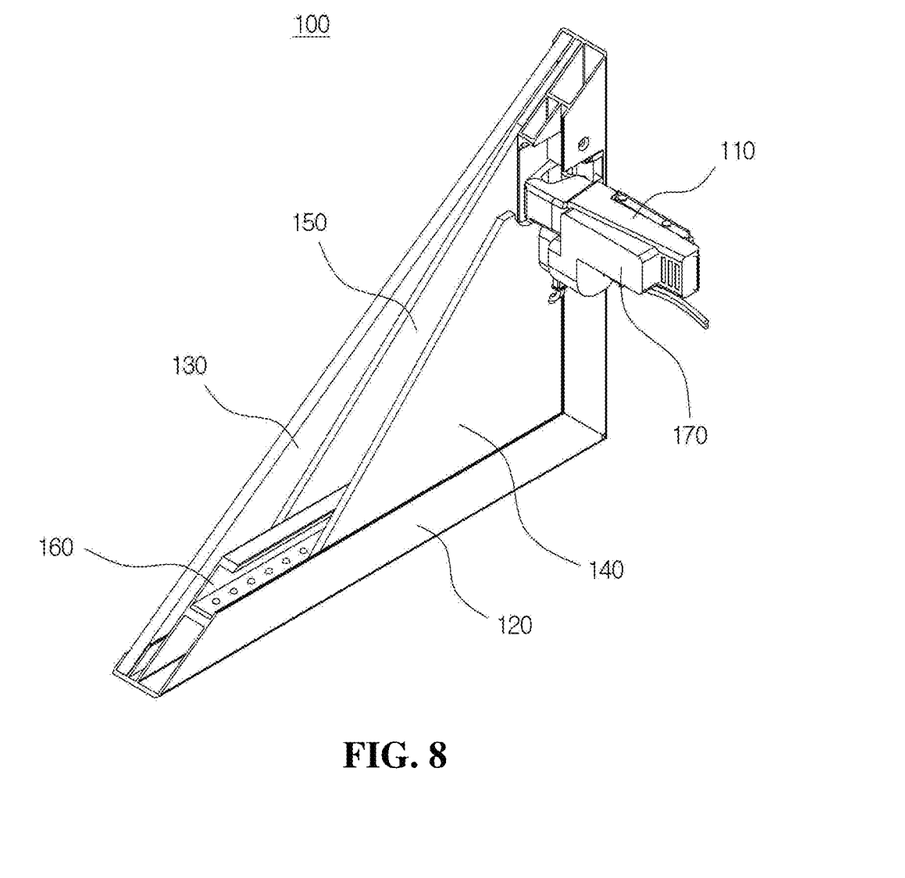
FIG. 8 is a perspective view illustrating another example of a door, a portion of which is cut away, having the transmittance-variable panel shown in FIG. 4.
Figure 9:
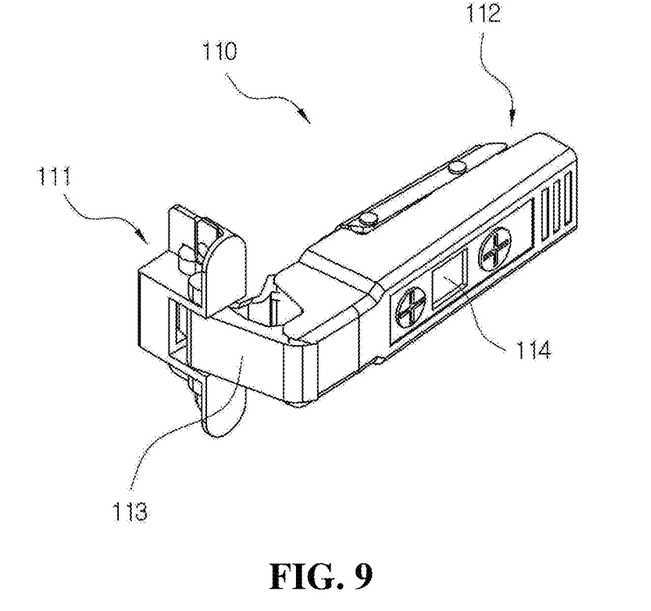
FIG. 9 is a perspective view illustrating a structure of a hinge shown in FIG. 8.
Figure 10:
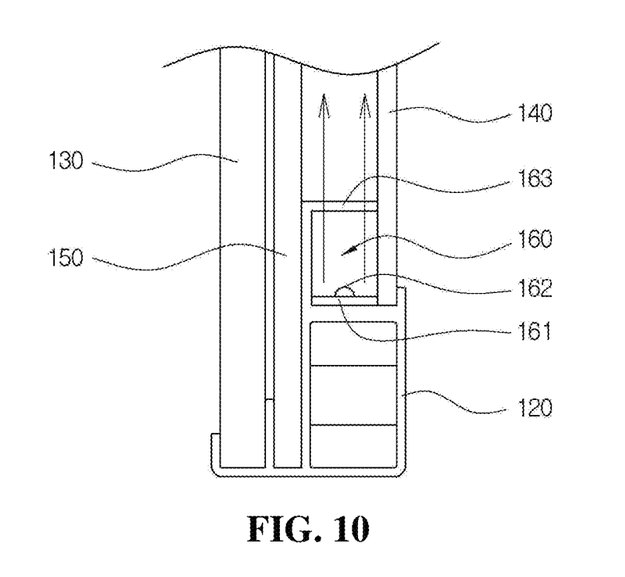
FIG. 10 is a partial front view of an example of the door having the transmittance-variable panel shown in FIG. 8.

FIG. 8 is a perspective view illustrating another example of a door, a portion of which is cut away, having the transmittance-variable panel shown in FIG. 4, FIG. 9 is a perspective view illustrating a structure of a hinge shown in FIG. 8, and FIG. 10 is a partial front view of an example of the door having the transmittance-variable panel shown in FIG. 8.

Another example of the door 100 having the transmittance-variable panel according to the present invention has a door 100, as shown in FIG. 8, including a frame 120 and mounted on a body with a hinge 110 to be opened and closed, and the door 100 includes a glass member 130 provided on a front surface side of the frame 120, a protective panel 140 provided on an inner surface side of the frame 120, a transmittance-variable panel 150 provided between the glass member 130 and the protective panel 140, a light-emitting member 160 provided between the protective panel 140 and the transmittance-variable panel 150, and a power supply member 170 configured to supply power to the light-emitting member 160.

As shown in FIG. 9, the hinge 110 includes a door fixing member 111, a body fixing member 112, and a link member 113 that connects the door fixing member 111 and the body fixing member 112 and is rotatably provided.

As shown in FIG. 8, the door fixing member 111 is fixed to the frame by a fastening member such as a screw, the body fixing member 112 includes a fixture coupled to the body, a fastening bolt fastened to the fixture, a coupling part fastened to the fastening bolt, and a pair of door adjustment bolts for adjusting the amount of protrusion of the body fixing member 112, and the link member 113 elastically fastens the door fixing member 111 and the body fixing member 112 through an opening and closing spring to open and close the door 100.

A coupling groove 114 is provided at one side of the body fixing member 112. That is, as shown in FIG. 8, the coupling groove 114 may be provided between the pair of door adjustment bolts.

In order to maintain the overall shape of the door 100, as shown in FIG. 8, the frame 120 may be made of an approximately quadrangular-shaped metal material, high-strength plastic, or wood material, and a packing member such as silicone, rubber, or the like for sealing the body may be provided on a circumferential portion of the frame 120. In addition, in the above description, the frame 120 is described as having a quadrangular shape, but is not limited thereto, and may be provided in a shape such as a circular shape or an elliptical shape.

As shown in FIGS. 8 and 10, the glass member 130 is tempered glass provided on a front surface side of the frame 120 to protect the transmittance-variable panel 150, and the glass member 130 may include a movement detection member. That is, the movement detection member is provided on an inner side of the glass member 130, detects the movement of the glass member 130 caused by a user touching or tapping the glass member 130, and transmits a detected signal to the light-emitting member 160. The movement detection member may be wired or wirelessly connected to the light-emitting member 160 using a typical method.

The protective panel 140 is a glass member provided on the inner surface side of the frame 120 in order to protect the transmittance-variable panel 150. In addition, although a configuration in which the glass member 130 and the protective panel 140 are made of tempered glass has been described above, the present invention is not limited thereto, and a transparent member that transmits light, for example, acrylic or the like, may be applied to the glass member 130 and the protective panel 140. As shown in FIG. 10, the glass member 130 and the protective panel 140 may be fitted into the frame 120 having a plurality of insertion portions and molded with a silicone resin.

A plurality of nano-sized pores are provided in the transmittance-variable panel 150 to reduce the transmittance of light incident from the outside of the door 100, and when the amount of light is increased between the transmittance-variable panel 150 and the protective panel 140 due to light irradiated from the light-emitting member 160, light transmittance is increased, so that an article inside the body can be confirmed from the outside. As shown in FIG. 10, the transmittance-variable panel 150 may also be fitted into the frame 120 having a plurality of insertion portions and may be molded with a silicone resin.

Figure 11:
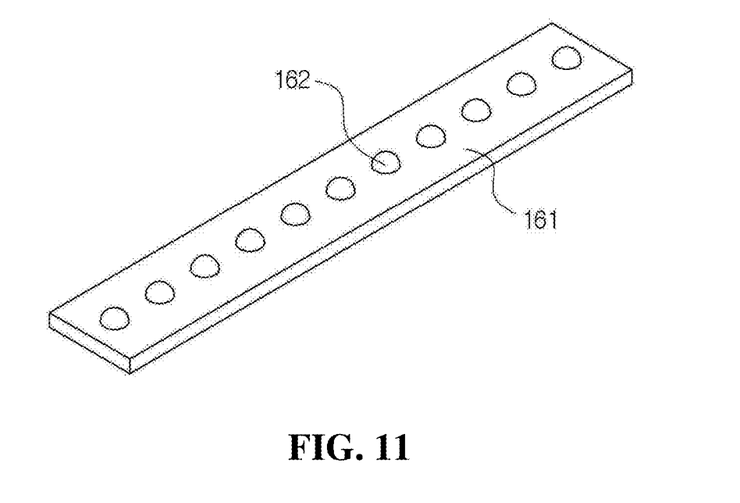
FIG. 11 is a view illustrating a light-emitting member shown in FIG. 10.

As shown in FIGS. 8 and 10, the light-emitting member 160 is provided on a lower portion of the transmittance-variable panel 150, and as shown in FIG. 11, the light-emitting member 160 includes a substrate 161, a plurality of LED light sources 162 provided on the substrate 161, and a diffusion plate 163 provided on the plurality of LED light sources 162. FIG. 11 is a view illustrating the light-emitting member shown in FIG. 8. In addition, in FIGS. 8 and 10, the structure in which the light-emitting member 160 is provided only on the lower portion of the frame 120 is illustrated, but the present invention is not limited thereto, and the light-emitting member 160 may also be provided on an upper portion of the frame 120. In addition, the light-emitting member 160 may be provided in a pair at the upper and lower portions of the frame 120, or may be provided in two pairs on each of side surfaces having a quadrangular shape. That is, the light-emitting member 160 may be provided in a plural number depending on the transmittance of the transmittance-variable panel 150 or the size of the door 100. That is, the door 100 shown in FIG. 8 is provided in the structure in which the light-emitting member is embedded in the door 100 unlike the structure of the door shown in FIG. 4. Accordingly, when the door shown in FIG. 8 is applied, the structure of the light-emitting member may be omitted from the body 200 shown in FIG. 4.

The plurality of LED light sources 162 may be provided to emit light toward the transmittance-variable panel 150 by adjusting a light emission angle. The substrate 161 may include a voltage change circuit configured to change the commercial power supplied from the body into a voltage suitable for the LED light source, a switching circuit configured to switch the supply of power from the power supply member 170 to the plurality of LED light sources 162 according to a detected signal by the movement detection member, and a timer configured to operate the switching circuit for a predetermined period of time. In addition, the LED light sources 162 may be provided to have an output having an optimal light reflectance according to the size and material of the plurality of nano-sized pores provided in the transmittance-variable panel 150.

The diffusion plate 163 may have a lens function so that light emitted from the plurality of LED light sources 162 faces an outer periphery of the transmittance-variable panel 150 as indicated by arrows in FIG. 10.

The power supply member 170 configured to supply power to the light-emitting member 160 will be described with reference to FIGS. 12 and 13.

Figure 12:
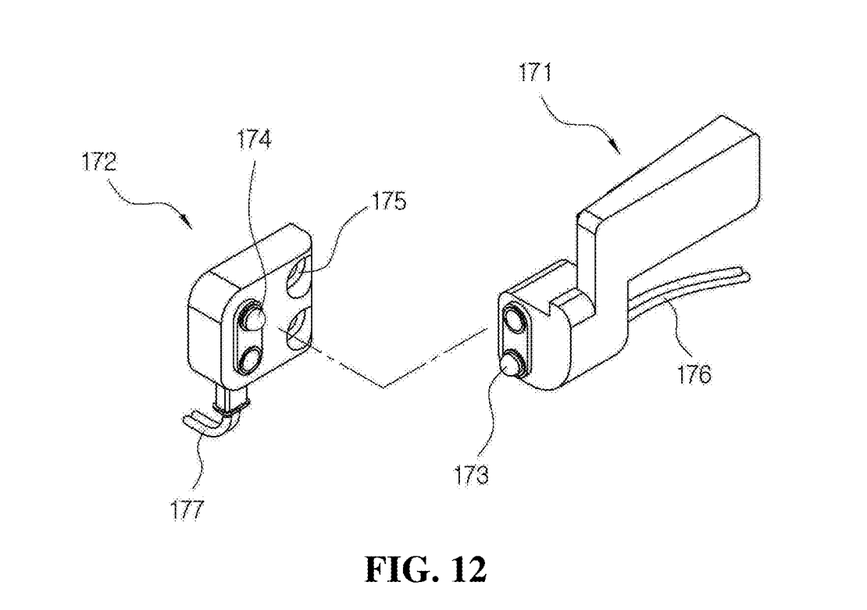
FIG. 12 is a perspective view illustrating a structure of a power supply member shown in FIG. 9.
Figure 13:
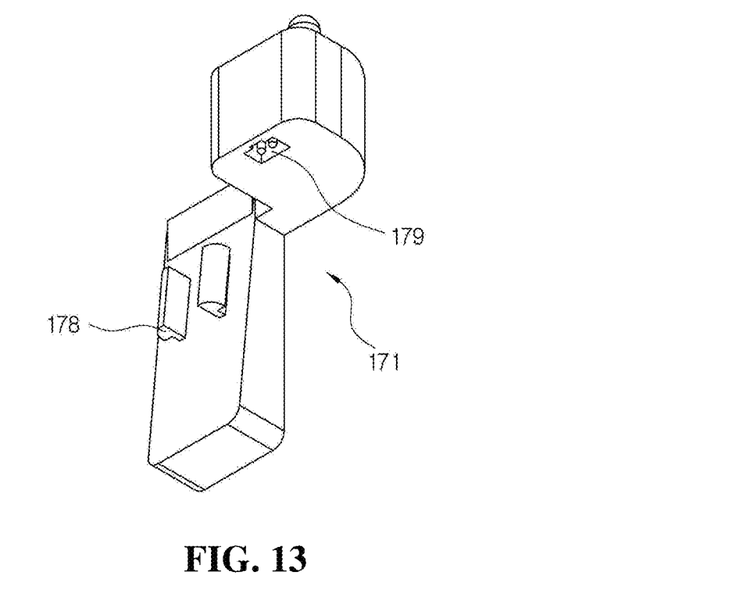
FIG. 13 is a perspective view illustrating a structure of a first power supply member shown in FIG. 12.

FIG. 12 is a perspective view illustrating a structure of the power supply member shown in FIG. 9, and FIG. 13 is a perspective view illustrating a structure of a first power supply member shown in FIG. 12.

As shown in FIGS. 9 and 12, the power supply member 170 includes a first power supply member 171 coupled to the hinge 110 and a second power supply member 172 coupled to the frame 120, and when the door 100 is closed, an electrical connection between the first power supply member 171 and the second power supply member 172 is formed, and when the door 100 is open, the electrical connection between the first power supply member 171 and the second power supply member 172 is cut off.

As shown in FIGS. 11 and 12, the first power supply member 171 includes a first protrusion 173 protruding from a first terminal, a first cable 176 electrically connected to the first terminal to receive power from the body, and a pair of coupling parts 178, and the first cable 176 is coupled to a connection jack 179.

The first terminal and the first protrusion 173 are provided to be electrically insulated from each other, and the first power supply member 171 is fastened to the hinge 110 by fitting the pair of coupling parts 178 into the coupling groove 114 provided in a body fixing part 112.

As shown in FIG. 12, the second power supply member 172 includes a second protrusion 174 protruding from a second terminal, a screw hole 175 provided to fix the second power supply member 172 to the frame 120 with a screw or the like, and a second cable 177 electrically connected to the first terminal to supply power to the light-emitting member 160. The second terminal and the second protrusion 174 are provided to be electrically insulated from each other, and power may be supplied to the light-emitting member 160 by the first protrusion 173 being brought into contact with the second terminal and the second protrusion 174 being brought into contact with the first terminal. That is, the first terminal is electrically insulated from the first protrusion 173 and electrically connected to the second protrusion 174. In addition, the second terminal is also electrically insulated from the second protrusion 174 and electrically connected to the first protrusion 173. The first protrusion 173 and the second protrusion 174 described above are provided to have, for example, functions of a positive (+) terminal and a negative (−) terminal.

As described above, by providing the first protrusion 173 to the first terminal and providing the second protrusion 174 to the second terminal, an electric shock may be prevented when in use, and the electrical connection state may be maintained even in the repetitive opening/closing operation of the door 100.

Thus, when the door 100 is opened from the body, the first protrusion 173 and the second protrusion 174 are spaced apart from each other so that the supply of power to the light-emitting member 160 is cut off, and when the door 100 is closed to the body, the first protrusion 173 and the second protrusion 174 are brought into contact with the first terminal and the second terminal, respectively, so that the voltage is maintained in a standby voltage state through the operation of the switching circuit.

Thereafter, when the user touches or taps the glass member 130, the movement detection member detects the movement, and information on the movement detection is transmitted to the light-emitting member 160 so that the switching circuit is turned on. Accordingly, when the plurality of LED light sources 162 emit light, since the amount of light between the transmittance-variable panel 150 and the protective panel 140 increases, an article inside the body can be confirmed from the outside through a plurality of nano-sized pores provided in the transmittance-variable panel 150. The light emission of the plurality of LED light sources 162 may operate only for a preset period of time with a timer configured to operate the switching circuit only for a predetermined period of time.

As described above, according to the present invention, since the plurality of LED light sources 162 emit light only for a preset period of time through the operation of the movement detection member and the timer, power consumption may be reduced.

Next, still another embodiment of the present invention will be described with reference to FIGS. 14 to 16.

Figure 14:
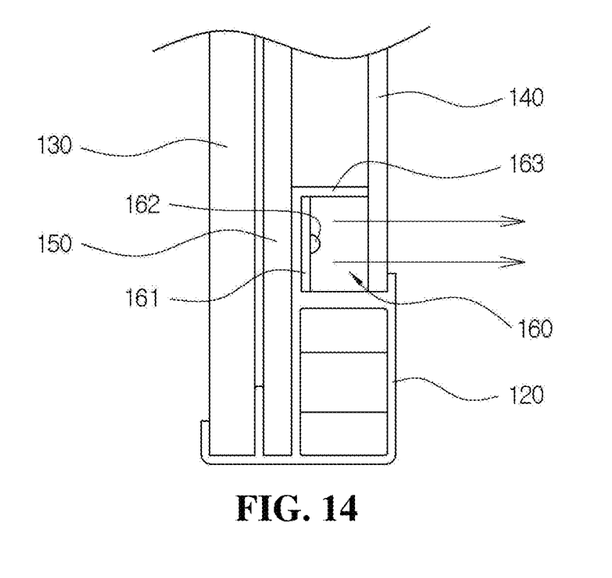
FIG. 14 is a partial front view of another example of the door having the transmittance-variable panel shown in FIG. 8.
Figure 15:
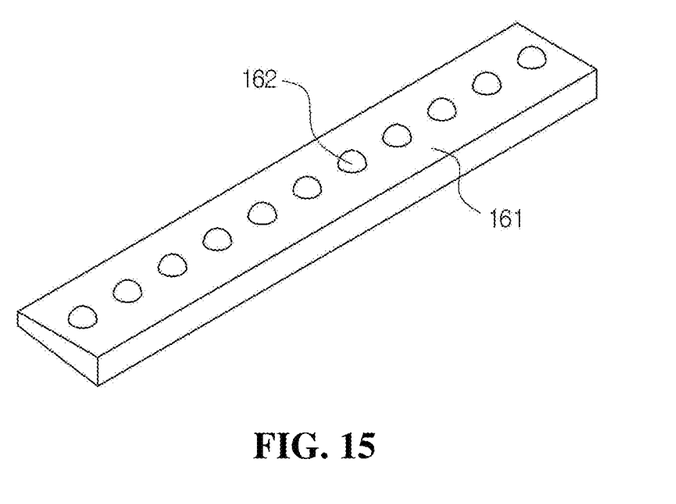
FIG. 15 is a view illustrating another example of a light-emitting member of a transmittance-variable panel according to the present invention.
Figure 16:
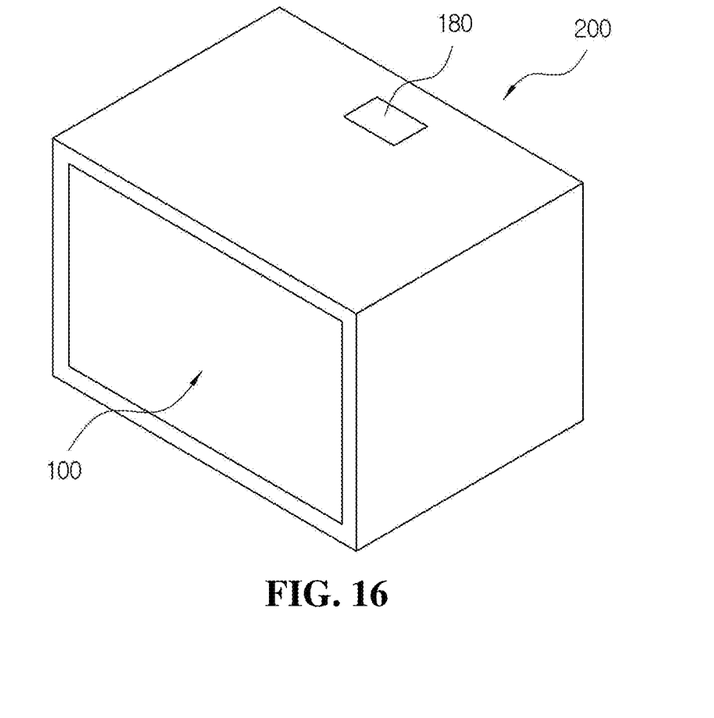
FIG. 16 is a view illustrating an example of a movement detection member mounted on a body having the transmittance-variable panel according to the present invention.

FIG. 14 is a partial front view of another example of a door having the transmittance-variable panel shown in FIG. 8, FIG. 15 is a view illustrating another example of a light-emitting member of a transmittance-variable panel according to the present invention, and FIG. 16 is a view illustrating an example of a movement detection member mounted on the body having the transmittance-variable panel according to the present invention.

In the embodiment described in FIGS. 10 and 11, the substrate 161 has a flat structure, and the plurality of LED light sources 162 are directed toward the outer periphery of the transmittance-variable panel 150, but as indicated by arrows in FIG. 14, the plurality of LED light sources 162 may be provided to face the inside of the body.

In addition, as shown in FIG. 15, the plurality of LED light sources 162 may be provided to face a transmittance-variable panel 150 by providing the substrate 161 in a trapezoidal shape. Thus, the installation of the light-emitting member 160 may be easily realized by applying the substrate 161 as shown in FIG. 15.

In addition, although the structure in which the movement detection member is provided on one side of the frame 120 has been described above, as shown in FIG. 16, a structure in which a movement detection member 180 is provided on an upper portion of the body 200 and causes the light-emitting member 160 to operate may also be applied. That is, a structure in which, when a user's movement, for example, the passing of a user's palm or the like, is detected by the movement detection member 180, the second power supply member 172 supplies power to the light-emitting member 160 may be provided.

Although the present invention has been described in detail with reference to the embodiments, it is to be understood that the present invention is not limited to the embodiments, and various modifications are possible to the extent that the gist of the invention is not deviated from.

That is, in the above description, as shown in FIG. 10, the structure in which the transmittance-variable panel 150 is mounted in a state parallel to the glass member 130 and LEDs of the light-emitting member 160 faces an edge of the transmittance-variable panel 150 is illustrated, but the present invention is not limited thereto, and the transmittance-variable panel 150 may be provided to be mounted obliquely with respect to the light-emitting member 160 so that light irradiated from the light-emitting member 160 passes through the glass member 130 through the plurality of nano-sized pores.

In addition, although the structure in which the first protrusion 173 is provided in the first terminal and the second protrusion 174 is provided in the second terminal has been described above, the present invention is not limited thereto, and a structure in which the first protrusion 173 and the second protrusion 174 are provided on either the first terminal or the second terminal may also be applied.

INDUSTRIAL APPLICABILITY

By using a storage box having a display panel according to the present invention, the amount of light incident from the outside is reduced, and the amount of light from a light-emitting member provided on the inside of a door is increased, so that an article inside a body can be confirmed from the outside.

The invention claimed is:

1. A storage box having a display panel comprising:
a body; and
a door including a frame and mounted on the body to be opened and closed,
wherein the door includes a glass member disposed on a front surface of the frame, a protective panel disposed on an inner surface of the frame, and a transmittance-variable panel disposed between the glass member and the protective panel,
the transmittance-variable panel is a panel made of a thermoplastic resin of polymethyl methacrylate (PMMA) or polycarbonate (PC) and nano-sized dyes,
a plurality of nano-sized pores are disposed in the transmittance-variable panel, and
the transmittance-variable panel is configured to reduce light transmittance.

2. The storage box having a display panel of claim 1, wherein
a size of each of the nano-sized pores is in a range of 20 to 50 nm,
a thickness of the transmittance-variable panel is 3 to 5 mm, and
an arithmetic average roughness (Ra) of a surface of the transmittance-variable panel is in a range of 1.2 to 1.9 nm.

3. The storage box having a display panel of claim 2, wherein a light emitter configured to irradiate light to the protective panel and the transmittance-variable panel is disposed in the body.

4. The storage box having a display panel of claim 2, wherein a light emitter is disposed between the protective panel and the transmittance-variable panel.

5. The storage box having a display panel of claim 4, further comprising a power supply member configured to supply power to the light emitter,
wherein the power supply member includes a first power supply member coupled to a hinge and a second power supply member coupled to the frame.

6. The storage box having a display panel of claim 5, wherein
an electrical connection between the first power supply member and the second power supply member is made when the door is closed, and
the electrical connection between the first power supply member and the second power supply member is cut off when the door is open.

7. The storage box having a display panel of claim 6, wherein
the first power supply member includes a first protrusion protruding from a first terminal,
the second power supply member includes a second protrusion protruding from a second terminal, and
power is supplied to the light emitter by the first protrusion being brought into contact with the second terminal and the second protrusion being brought into contact with the first terminal.

8. The storage box having a display panel of claim 6, wherein
a coupling groove is disposed on a side surface of the hinge,
a pair of couplers is disposed in the first power supply member, and
the first power supply member is fastened to the hinge by fitting the pair of couplers into the coupling groove.

9. The storage box having a display panel of claim 3, wherein:
a movement detector is disposed in the door, and
the light emitter emits light when a movement of the door is detected by the movement detector.

10. The storage box having a display panel of claim 3, wherein:
a movement detector is disposed in the body or door, and
the light emitter emits light when a movement of a user is detected by the movement detector.

11. The storage box having a display panel of claim 4, wherein:
a movement detector is disposed in the door, and
the light emitter emits light when a movement of the door is detected by the movement detector.

12. The storage box having a display panel of claim 4, wherein:
a movement detector is disposed in the body or door, and
the light emitter emits light when a movement of a user is detected by the movement detector.

* * * * *